United States Patent
Oliver et al.

(10) Patent No.: US 6,536,565 B2
(45) Date of Patent: Mar. 25, 2003

(54) ROTARY DAMPER

(75) Inventors: Michael L. Oliver, Xenia, OH (US); William C. Kruckemeyer, Beavercreek, OH (US); Mark Bodie, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/800,442

(22) Filed: Mar. 6, 2001

(65) Prior Publication Data

US 2002/0125086 A1 Sep. 12, 2002

(51) Int. Cl.[7] .............................................. F16D 57/00
(52) U.S. Cl. ...................................... 188/290; 188/307
(58) Field of Search ................................ 188/290, 293, 188/295, 296, 306, 307, 308, 309, 310, 294

(56) References Cited

U.S. PATENT DOCUMENTS

| 933,076 A | | 9/1909 | Houdaille | |
|---|---|---|---|---|
| 1,444,248 A | * | 2/1923 | Hofmann | 188/304 |
| 1,876,862 A | * | 9/1932 | Cross | 188/306 |
| 2,019,974 A | * | 11/1935 | Houdaille | 188/309 |
| 2,334,340 A | | 11/1943 | Magrum | |
| 2,358,988 A | | 9/1944 | Magrum | |
| 2,409,505 A | | 10/1946 | Magrum | |
| 4,411,341 A | | 10/1983 | Schultz | |
| 4,503,952 A | | 3/1985 | Hesse | |
| 4,674,608 A | * | 6/1987 | Morris et al. | 188/290 |
| 4,768,630 A | | 9/1988 | Aubry et al. | |
| 4,886,149 A | | 12/1989 | Uehara et al. | |
| 4,893,700 A | | 1/1990 | Gramss | |
| 4,913,255 A | | 4/1990 | Takayanagi et al. | |
| 4,926,984 A | | 5/1990 | Pollitt | |
| 5,005,859 A | | 4/1991 | Satoh et al. | 188/130 |
| 5,074,581 A | | 12/1991 | Matsuoka | |
| 5,152,189 A | | 10/1992 | Miura et al. | |
| 5,450,932 A | | 9/1995 | Nash | |
| 5,810,129 A | | 9/1998 | Hanawa et al. | |
| 5,901,821 A | | 5/1999 | Hanawa | |
| 5,988,329 A | | 11/1999 | Evans, Jr. et al. | |
| 6,082,507 A | | 7/2000 | Förster | 188/308 |
| 6,085,384 A | | 7/2000 | Bivens | |
| 6,089,121 A | | 7/2000 | Lohaus | |
| 6,098,765 A | | 8/2000 | Kato et al. | 188/307 |
| 6,119,839 A | | 9/2000 | Jäckel et al. | |
| 6,119,840 A | | 9/2000 | Dettmar | |
| 6,120,046 A | | 9/2000 | Daly | |
| 6,121,526 A | | 9/2000 | Kobori et al. | |

FOREIGN PATENT DOCUMENTS

| EP | 0 240 499 B1 | | 4/1989 | | |
|---|---|---|---|---|---|
| JP | 56-90712 A | * | 7/1981 | | 188/306 |
| JP | 4-203630 A | * | 7/1992 | | 188/296 |
| JP | 4-249631 A | * | 9/1992 | | 188/296 |
| JP | 5-60161 A | * | 3/1993 | | 188/307 |
| JP | 5-280568 A | * | 10/1993 | | 188/293 |

* cited by examiner

*Primary Examiner*—Jack Lavinder
*Assistant Examiner*—Thomas J. Williams
(74) *Attorney, Agent, or Firm*—Scott A. McBain (57) ABSTRACT

A rotary damper for use in motor vehicle suspensions comprising a rotor disposed within damping fluid in a fluid chamber of a case to form fluid volumes, with valves for flow control and an accumulator for fluid fill variation and thermal expansion mounted internal to the rotor. A first check valve and first control valve mounted in a first flow passage within the rotor allow flow from second fluid volume to first fluid volume, but restrict flow from the first fluid volume to the second fluid volume. Similarly, a second check valve and a second control valve mounted in a second flow passage within the rotor allow flow from the first fluid volume to the second fluid volume, but restrict flow from the second fluid volume to the first fluid volume. Thus, the valves are configured to provide independent control of damping for each direction of rotation.

17 Claims, 6 Drawing Sheets

ROTARY DAMPER

TECHNICAL FIELD

This invention relates generally to the field of rotary dampers, and in particular, to rotary dampers for use in motor vehicle suspensions.

BACKGROUND OF THE INVENTION

Rotary dampers, as used in vehicle suspensions, typically include a body with a means of fixed attachment and an axle or shaft that is used for rotary attachment. Bodies of vane type dampers have a chamber containing fluid and the axle is attached to a rotor with a vane or vanes closely fit into the fluid chambers. When torque is applied to the axle to cause rotation, the vanes apply pressure on the fluid to cause the fluid to flow through orifices or valves. The resistance of the fluid to flow through the orifices or valves causes the rotary damper to resist or damp the motion that is a result of the torque applied to the shaft. This type rotary damper generally includes some air space or a gas accumulator to allow for fluid thermal expansion and fill variation.

Currently, rotary dampers are manufactured with portions of the assembly, such as the valves, orifices, or accumulator, external to the rotor. This increases the complexity of manufacture and installation. Extra steps are required to install the rotary dampers in the motor vehicle. Parts are exposed, leaving them vulnerable to damage.

Rotary dampers typically provide the same damping regardless of the direction of axle rotation, limiting tuning options. The same torque is applied to the axle whether that is the proper amount of torque needed for that direction.

Accumulators located within the fluid chambers are exposed to external pressures as the vanes apply pressure to the fluid. This requires the accumulator walls be heavier and more rigid to withstand the external pressures.

Accordingly, it would be desirable to have a rotary damper that overcomes the disadvantages described.

SUMMARY OF THE INVENTION

One aspect of the invention provides all valves, orifices and an accumulator to be housed in the rotor, allowing easy assembly, a compact overall package, and a simple, rugged case.

Another aspect of the invention provides valves configured to provide independent control of damping for each direction of rotation.

Another aspect of the invention provides a connection to the accumulator that isolates the accumulator from pressures generated by damping pressures in the fluid chambers outside the rotor.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
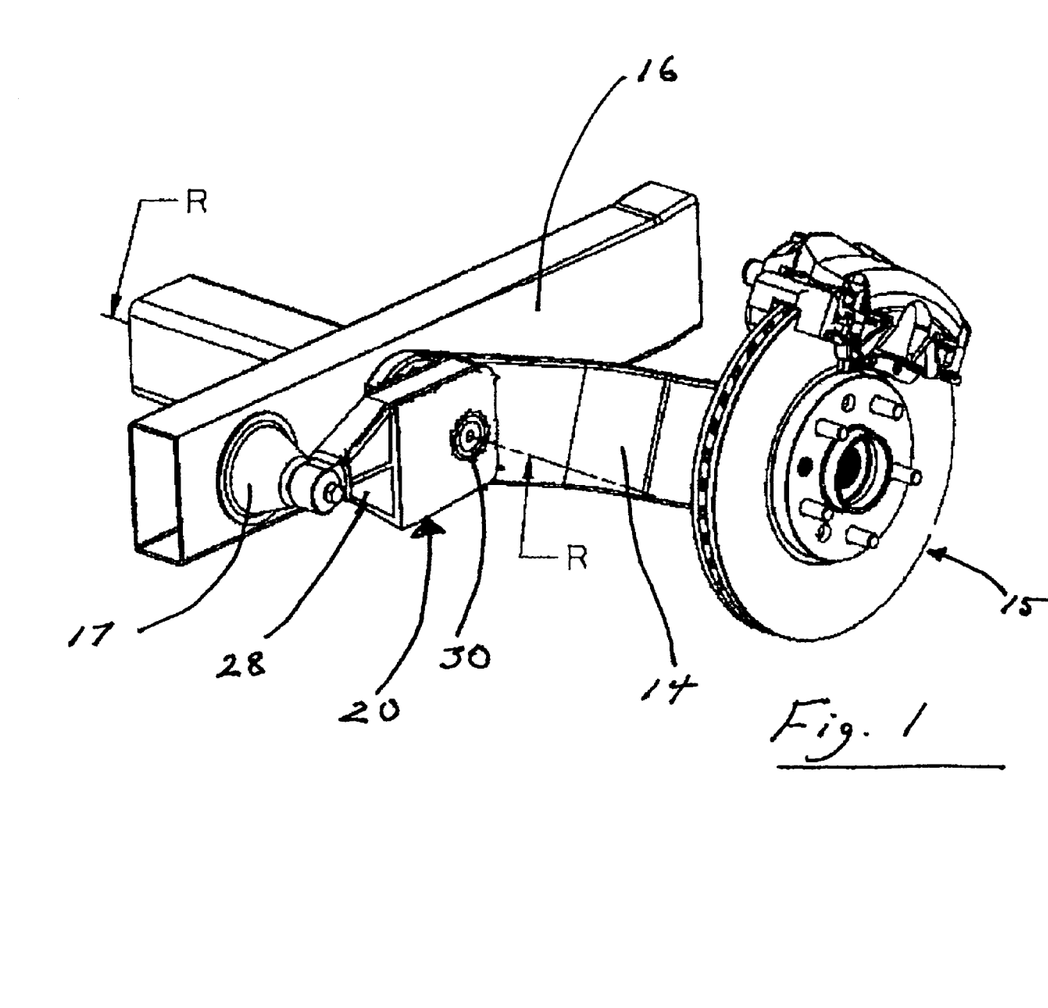
FIG. 1 is a perspective view of a suspension system incorporating a rotary damper that is made in accordance with the present invention.

FIG. 1 is a perspective view of a suspension system incorporating a rotary damper that is made in accordance with the present invention. Trailing arm 14 supports wheel assembly 15 and is pivotably attached to chassis member 16. Rotary damper 20 has an axle 30 engaging the trailing arm 14 at the pivot point and providing torque to resist the motion of the trailing arm 14. Mounting post 17 projects from the chassis member 16 and connects to mounting arm 28 of the rotary damper 20 to hold the rotary damper 20 stationary.

Figure 2:
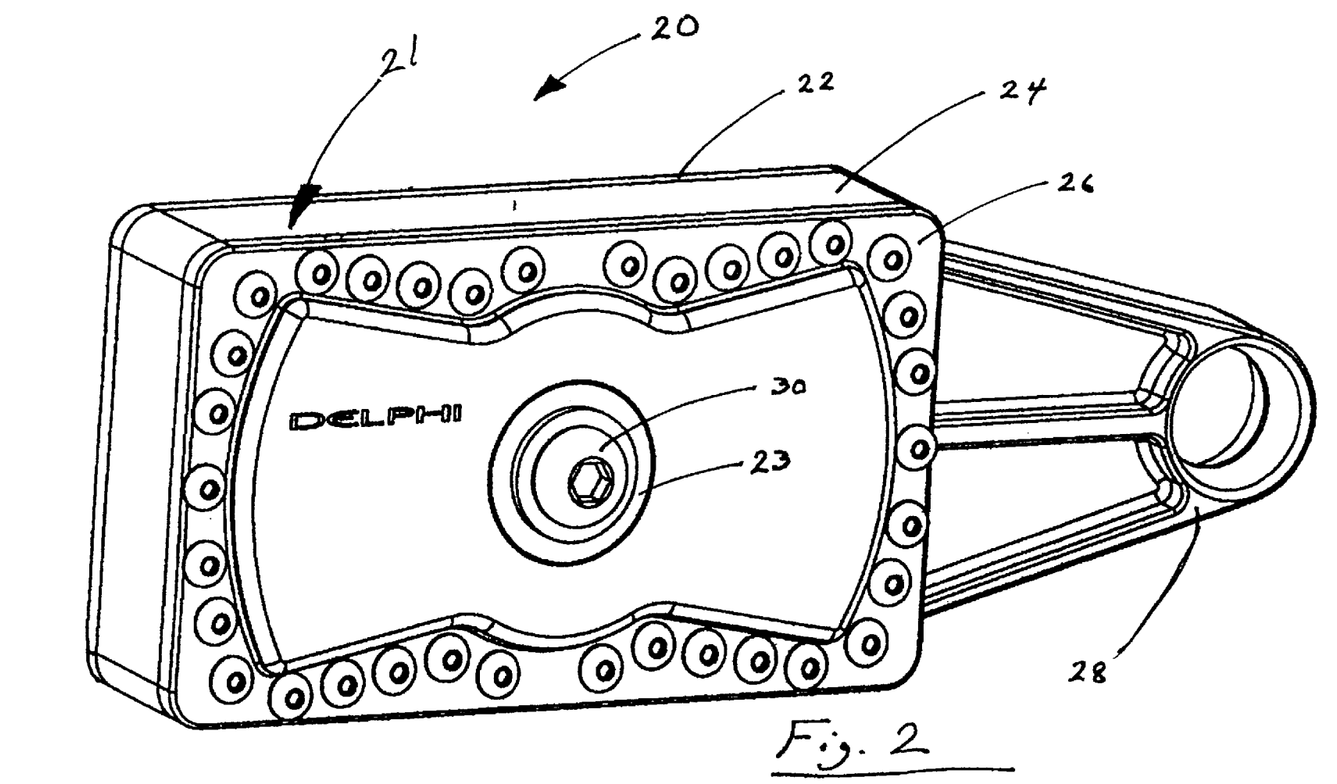
FIG. 2 is an external view of a preferred embodiment of a rotary damper that is made in accordance with the invention.

As shown in the external view of FIG. 2, rotary damper 20 has a case 21 that comprises rear side plate 22, body 24, front side plate 26, and mounting arm 28. The case 21 contains the damping fluid and fits the internal components to seal and direct damping fluid flow where desired. Axle 30 is part of the rotor and passes through the front side plate 26 at axle opening 23, which aligns the rotor with the body 24 and seals the damping fluid in the case 21. The other end of axle 30 passes through a similar axle opening (not shown) in the rear side plate 22. The mounting arm 28 anchors the body 24 to the vehicle chassis to prevent rotation of the case 21.

Figure 3:
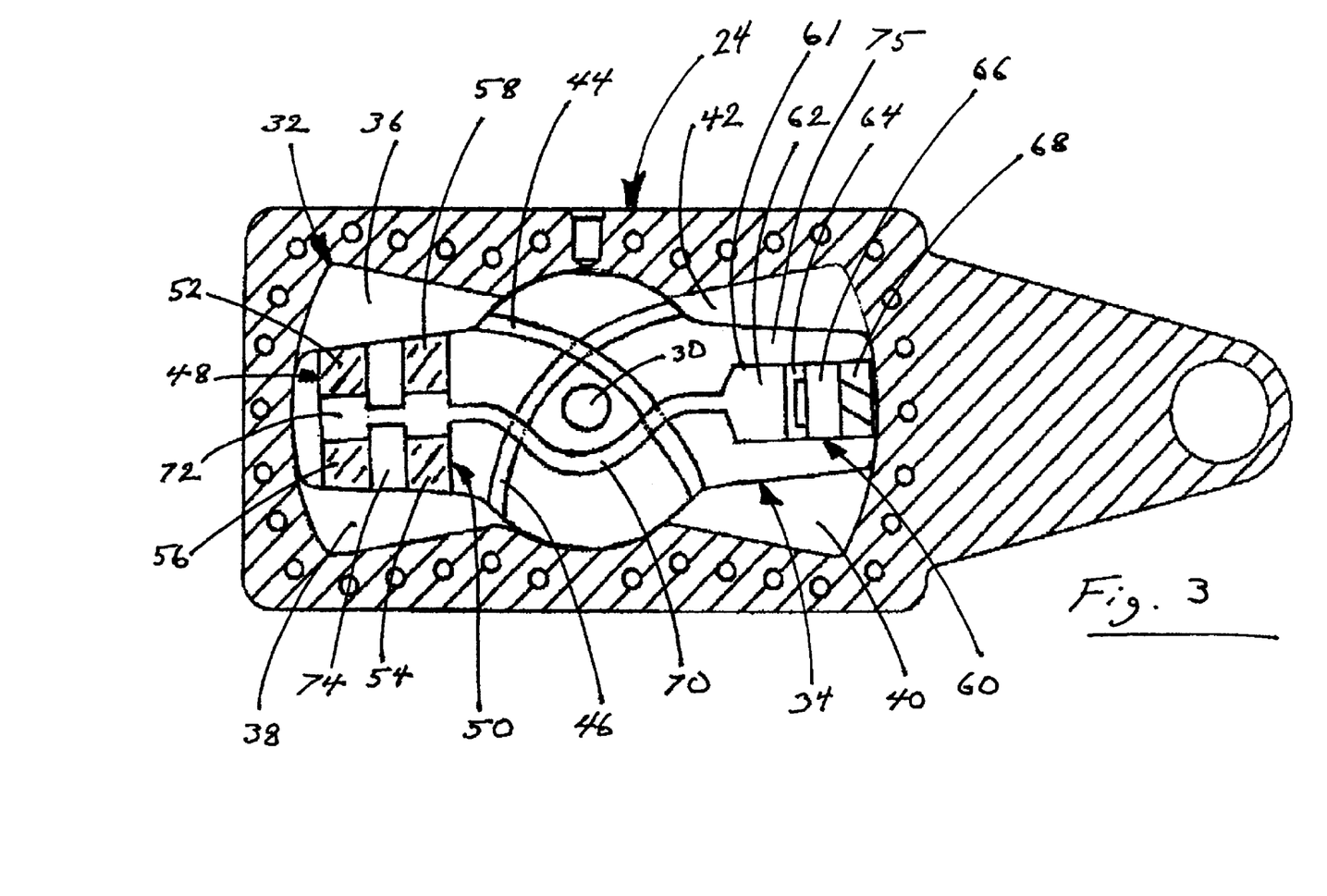
FIG. 3 is a schematic diagram of a preferred embodiment of a rotary damper that is made in accordance with the invention.
Figure 4:
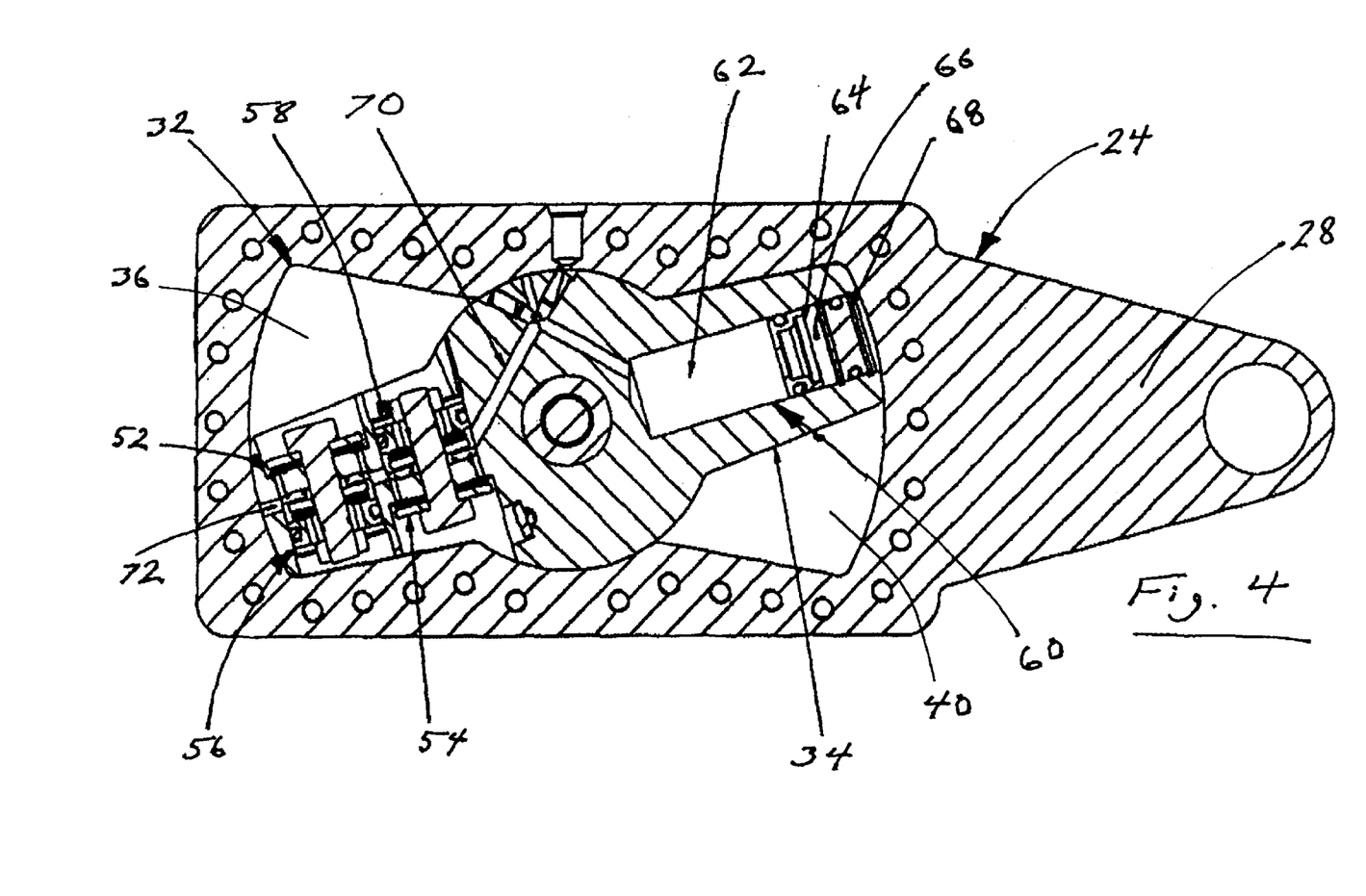
FIG. 4 is a section view of a preferred embodiment of a rotary damper that is made in accordance with the invention.

FIGS. 3 and 4 illustrate the internal workings of a rotary damper according to the present invention. FIG. 3 is a schematic view showing the rotor in an intermediate position and FIG. 4 is a section view showing the rotor in an full counterclockwise rotation.

Referring to FIG. 3, the body 24 forms a fluid chamber 32, which contains rotor 34. The rotor 34, having a first rotor vane 74 and a second rotor vane 75, rotates about the axle 30. Although a two-vane design is illustrated, alternate rotor embodiments may use multiple vanes. The tips of the rotor vanes are closely fitted to the walls of the fluid chamber 32. The rotor 34 is held in place laterally by the side plates as shown in FIG. 2.

When installed in the body 24, the rotor 34 divides the fluid chamber 32 into first fluid volume 36, second fluid volume 38, third fluid volume 40, and fourth fluid volume 42. The fluid volumes are closed on the sides by the front and rear side plates and are filled with damping fluid (not shown) that provides the resistance to the motion of rotor 34 during operation.

All tunable and moveable parts of the rotary damper, such as the valves and accumulator, are installed within volumes and passages inside the rotor 34. This allows the rotor to be pre-assembled and charged with gas before assembly, and creates a sealed rotary damper requiring no hydraulic connections to the outside.

Passages in the rotor 34 provide for component installation and allow fluid flow during operation. First fluid passage 44 connects the first fluid volume 36 and the third fluid volume 40. Second fluid passage 46 connects the second fluid volume 38 and the fourth fluid volume 42. These fluid passages equalize the pressure between the connected fluid volumes as the rotor moves during operation, allowing pressure change in each fluid volume to carry over to the corresponding diagonal fluid volume.

First flow passage 48 and second flow passage 50 in the rotor 34 connect the first fluid volume 36 and the second fluid volume 38. First check valve 52 and first control valve 56 are installed in the first flow passage 48; second check valve 54 and second control valve 58 are installed in the second flow passage 50. The control valves and check valves control the damping fluid flow between the fluid volumes and pressures in the fluid volumes.

When the rotor 34 rotates in the clockwise direction, the pressure in the first fluid volume 36 increases. The first check valve 52 blocks damping fluid flow from the first fluid volume 36 to the second fluid volume 38 through the first flow passage 48, but the second check valve 54 allows the flow through the second flow passage 50. The second control valve 58 regulates the flow through the second flow passage 50. If the rotor 34 rotates in the counterclockwise direction, the second check valve 54 blocks flow, the first check valve 52 allows flow through the first flow passage 48 to the first fluid volume 36, and the second control valve 58 regulates the flow. Because one control valve governs flow for one direction of rotation and another control valve governs the opposite rotation, the rotary damper can be tuned to provide different damping for different directions by sizing the control valves differently. This is ideal for motor vehicle applications because it is desirable to have a rotary damper that provides less resistance as the tire moves in the upward direction and more resistance as the tire moves downward.

The preferred embodiment uses a check valve and control valve to govern flow, but alternate embodiments may use different flow control devices. The check valves may be omitted or replaced with pressure relief valves. Check valves may contain leakage paths to allow backflow in the normally blocked direction. The control valves may be replaced with orifices. Different valve combinations, mixing orifices, pressure relief valves, and control valves, for example, will result in different tunings to achieve any desired damping response.

Accumulator 60 in the rotor 34 provides a volume to allow for damping fluid fill variation and thermal expansion. The accumulator 60 comprises accumulator wall 61, accumulator cap 68, accumulator gas plenum 66, accumulator piston 64, and accumulator volume 62. The accumulator wall 61 is formed from the interior of the rotor 34. The accumulator piston 64 slides along accumulator wall 61 within the accumulator 60, which is closed by the accumulator cap 68, to form the accumulator gas plenum 66 between the accumulator piston 64 and the accumulator cap 68. The accumulator gas plenum 66 is filled with gas to a desired pressure to allow for fill variation and thermal expansion. The accumulator piston 64 moves in response to the pressure difference between the accumulator gas plenum 66 and the accumulator volume 62. Typically, the fluid will expand once the motor vehicle trip starts and stay the same volume until the trip ends and the fluid cools. The accumulator volume 62 connects to valve passage 72 through accumulator passage 70. Using the pressure of the valve passage 72 to adjust the accumulator pressure isolates the accumulator from the control functions of the damper and avoids exposing the exterior of the accumulator to the fluid volume working pressures. Although the preferred embodiment uses a cylindrical gas-filled piston accumulator, other accumulator embodiments using mechanical devices, such as springs, or other compressible materials in place of gas are possible and are known to those skilled in the art.

Referring to FIG. 4, the body 24 includes the mounting arm 28 for attachment. The rotor 34 is shown rotated in the body 24 to the full counterclockwise position, so that first fluid volume 36 and third fluid volume 40 are at their largest volumes and the other fluid volumes are no longer visible. The rotor 34 includes the accumulator 60 that includes the fluid chamber 32, the accumulator piston 64 with a seal that is free to slide in the accumulator 60 and the accumulator cap 68 which seals the accumulator 60. The accumulator gas plenum 66 in the accumulator 60 between the accumulator piston 64 and the accumulator cap 68 contains pressurized gas. The accumulator 60 allows the rest of the damper to be filled with fluid under pressure while allowing for fill variations and fluid thermal expansion.

First check valve 52, second check valve 54, first control valve 56, and second control valve 58 are mounted in the rotor 34 to control the flow through the fluid chamber 32 in response to rotor 34 motion. The valves are deflected disk valves similar to valves used in some linear type shock absorbers. Each valve set includes a control valve and a check valve. The two valve sets are configured so that valve controlling each direction of rotation is distinct and can be adjusted independently. The valve passage 72 between the control valve and check valve of each valve set connects the valve sets and connects to the accumulator volume 62 through accumulator passage 70 in order to hydraulically isolate the accumulator 60 from the control functions of the damper.

Other passages are provided in the rotor 34 to equalize pressures between diagonally opposite fluid volumes as shown in FIG. 3 above. These passages allow the control valves to affect all four fluid volumes. A fill passage connecting the outside of the rotor to the accumulator gas plenum may be provided to allow gas charging of the accumulator gas plenum. To seal the plenum after filling, the fill passage must be sealed using a check valve and a closing plug, or some type of ball-in-hole filling feature. Various bearings and seals are provided in the rotary damper to align moving parts and control fluid leakage. The damping fluid typically lubricates the bearings.

Figure 5:
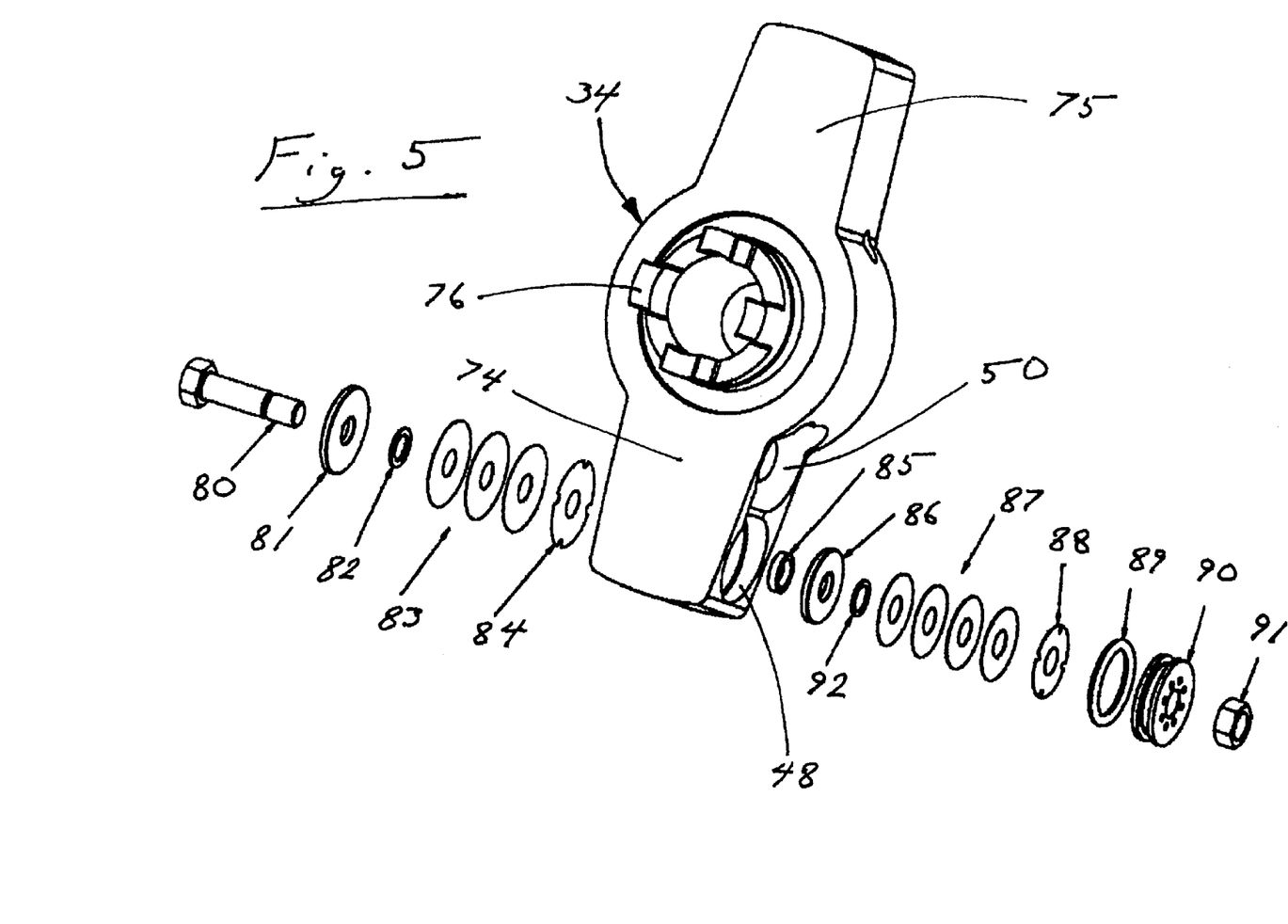
FIG. 5 is an exploded view of the valve and rotor of a preferred embodiment of a rotary damper that is made in accordance with the invention.
Figure 6:
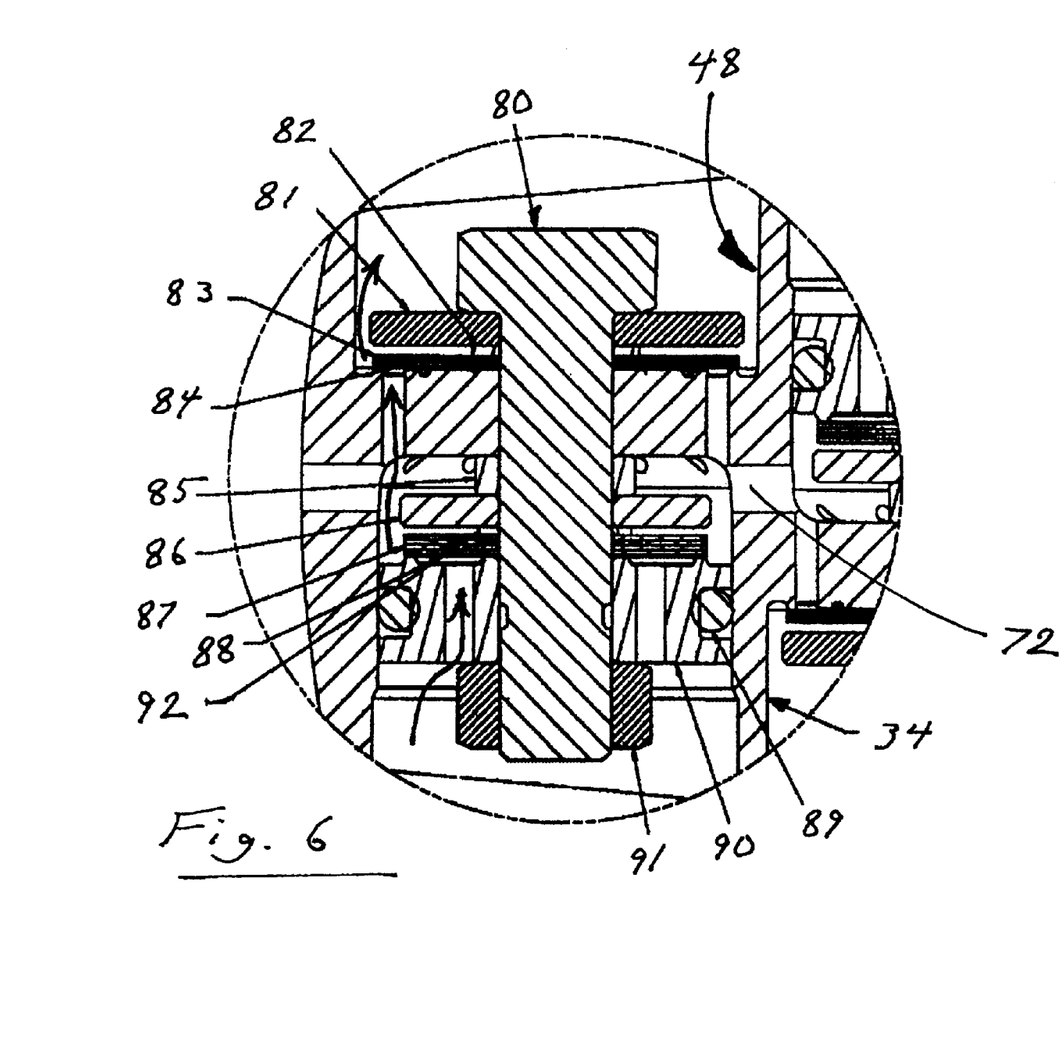
FIG. 6 is a section view of the valve detail of a preferred embodiment of a rotary damper that is made in accordance with the invention.

FIGS. 5 and 6 show exploded and detailed section views of the flow control and check valves. The rotor 34 has first rotor vane 74, second rotor vane 75, axle lugs 76, first flow passage 48, and second flow passage 50. The axle lugs 76 engage the trailing arm and transfer the torque from the rotor (See FIG. 1). FIG. 5 shows an exploded view of the valve set installed in first flow passage 48. The check valve of the valve set includes a check valve stop plate 81, a spacer 82 to limit valve deflection, one or more check valve deflected discs 83 and, optionally, an orifice plate 84 if some backflow is to be allowed through the check valve. The check valve deflected discs 83 seal against a seat formed within the first flow passage 48 in the rotor 34. Although normally a check valve is used, a pressure relief valve can be substituted as an alternative if unit performance tuning requires.

The control valve includes a flow clearance spacer 85 to provide flow clearance, control valve stop plate 86, valve deflection limiting spacer 92 to limit valve deflection, one or more control valve deflected discs 87, optionally, orifice disc 88, and valve seat 90 with seal 89. Bolt 80 holds the parts in place with nut 91. The control valve deflected discs 87 seal against the valve seat 90, which seals inside the bore of the rotor 34 with the seal 89. The control valves are deflected disk valves similar to valves used in some linear type shock absorbers.

As torque is applied to the rotor during operation, the fluid in the fluid volumes is pressurized and acts on the valve sets. Depending on direction of torque, pressure builds in two diagonally opposite chambers. One valve set presents a check valve that will remain closed. The other set presents a control valve that allows flow dependent on the pressure applied. The check valve opposite the control valve allows the flow to exit the valve area into an unpressurized chamber. Arrows in FIG. 6 show a typical flow path. This flow through the control valve, flow allowed by orifice plates (if any) and other internal leakage permit the rotor to rotate, damping movement resulting from the applied torque. Torque applied in different direction (clockwise versus counterclockwise) applies pressure to different valve sets allowing the damping to be set or tuned separately for the different rotations.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotary damper using damping fluid comprising:
   a case having a fluid chamber containing the damping fluid and an axle opening;
   a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening;
   a first check valve mounted in the first flow passage, allowing damping fluid flow from the second fluid volume to the first fluid volume, and limiting flow from the first fluid volume to the second fluid volume;
   a first control valve mounted in the first flow passage, controlling damping fluid flow between the first fluid volume and the second fluid volume, the first control valve being a deflected disk valve;
   a second check valve mounted in the second flow passage, allowing damping fluid flow from the first fluid volume to the second fluid volume, and limiting flow from the second fluid volume to the first fluid volume; and
   a second control valve mounted in the second flow passage, controlling damping fluid flow between the first fluid volume and the second fluid volume;
   wherein the rotor contains an accumulator hydraulically connected to the fluid chamber.

2. The rotary damper of claim 1 wherein the accumulator comprises an accumulator wall, an accumulator cap sealing the accumulator wall from the fluid chamber, an accumulator piston slidably mounted within the accumulator wall, an accumulator gas plenum within the accumulator wall between the accumulator cap and the accumulator piston, and an accumulator volume within the accumulator wall adjacent to the accumulator volume and hydraulically connected to the fluid chamber.

3. The rotary damper of claim 1 wherein the accumulator volume is hydraulically connected to the fluid chamber by an accumulator passage through the rotor, the accumulator passage being connected to a valve passage joining the first flow passage between the first check valve and the first control valve and the second flow passage between the second check valve and the second control valve, the valve passage being hydraulically connected to the fluid chamber.

4. A rotary damper using damping fluid comprising:
   a case having a fluid chamber containing the damping fluid and an axle opening;
   a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening;
   a first check valve mounted in the first flow passage, allowing damping fluid flow from the second fluid volume to the first fluid volume, and limiting flow from the first fluid volume to the second fluid volume;
   a first control valve mounted in the first flow passage, controlling damping fluid flow between the first fluid volume and the second fluid volume, the first control valve being a deflected disk valve;
   a second check valve mounted in the second flow passage, allowing damping fluid flow from the first fluid volume to the second fluid volume, and limiting flow from the second fluid volume to the first fluid volume; and
   a second control valve mounted in the second flow passage, controlling damping fluid flow between the first fluid volume and the second fluid volume;
   wherein the rotor is disposed within the fluid chamber to divide the fluid chamber into the first fluid volume, the second fluid volume, a third fluid volume, and a fourth fluid volume, the first fluid volume and the third fluid volume having fluid pressure change the same direction from rotation of the rotor, the second fluid volume and the fourth fluid volume having fluid pressure change the same direction from rotation of the rotor, a first fluid passage within the rotor connecting the first fluid volume and the third fluid volume, and a second fluid passage within the rotor connecting the second fluid volume and the fourth fluid volume.

5. A rotary damper using damping fluid comprising:
   a case having a fluid chamber containing the damping fluid and an axle opening;
   a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening, the first rotor vane further comprising a second means for controlling flow between the first fluid volume and the second fluid volume mounted in the second flow passage; and
   a first means for controlling flow between the first fluid volume and the second fluid volume mounted in the first flow passage;
   wherein the first flow control means is a first check valve in series with a first control valve directing flow from the second fluid volume to the first fluid volume, the second flow control means is a second check valve in series with a second control valve directing flow from the first fluid volume to the second fluid volume, and the first check valve allows backflow from the first fluid volume to the second fluid volume.

6. The rotary damper of claim 5 wherein the second check valve allows backflow from the second fluid volume to the first fluid volume.

7. A rotary damper using damping fluid comprising:
a case having a fluid chamber containing the damping fluid and an axle opening;
a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening, the first rotor vane further comprising a second means for controlling flow between the first fluid volume and the second fluid volume mounted in the second flow passage; and
a first means for controlling flow between the first fluid volume and the second fluid volume mounted in the first flow passage;
wherein the first flow control means is a first check valve in series with a first control valve directing flow from the second fluid volume to the first fluid volume, the second flow control means is a second check valve in series with a second control valve directing flow from the first fluid volume to the second fluid volume, and the first check valve is a first pressure relief valve allowing backflow from the first fluid volume to the second fluid volume after exceeding the first pressure relief valve setpoint.

8. The rotary damper of claim 7 wherein the second check valve is a second pressure relief valve allowing backflow from the second fluid volume to the first fluid volume after exceeding the second pressure relief valve setpoint.

9. A rotary damper using damping fluid comprising:
a case having a fluid chamber containing the damping fluid and an axle opening;
a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening, the first rotor vane further comprising a second means for controlling flow between the first fluid volume and the second fluid volume mounted in the second flow passage; and
a first means for controlling flow between the first fluid volume and the second fluid volume mounted in the first flow passage;
wherein the first flow control means is a first check valve in series with a first control valve directing flow from the second fluid volume to the first fluid volume, the second flow control means is a second check valve in series with a second control valve directing flow from the first fluid volume to the second fluid volume, and the first check valve allows backflow from the first fluid volume to the second fluid volume and the second check valve is a pressure relief valve allowing backflow from the second fluid volume to the first fluid volume after exceeding the pressure relief valve setpoint.

10. A rotary damper using damping fluid comprising:
a case comprising a front side plate, a body, a rear side plate, the body having a butterfly-shaped fluid chamber containing the damping fluid, the front side plate having a first axle opening, the rear side plate having a second axle opening radially aligned with the first axle opening, the body sandwiched between the front side plate and rear side plate;
a rotor comprising an axle, a first rotor vane transversely attached to the axle, a second rotor vane transversely attached to the axle opposite to the first rotor vane, the axle passing through and supported by the first axle opening and the second axle opening, the first rotor vane disposed within the fluid chamber so as to form a first fluid volume and a second fluid volume, the second rotor vane disposed within the fluid chamber so as to form a third fluid volume and a fourth fluid volume, the first rotor vane having a first flow passage and a second flow passage connecting the first fluid volume and the second fluid volume, the rotor having a first fluid passage connecting the first fluid volume and the third fluid volume and having a second fluid passage connecting the second fluid volume and the fourth fluid volume;
a first check valve mounted in the first flow passage, allowing damping fluid flow from the second fluid volume to the first fluid volume, and limiting flow from the first fluid volume to the second fluid volume;
a first control valve mounted in the first flow passage, controlling damping fluid flow between the first fluid volume and the second fluid volume, the first control valve being a deflected disk valve;
a second check valve mounted in the second flow passage, allowing damping fluid flow from the first fluid volume to the second fluid volume, and limiting flow from the second fluid volume to the first fluid volume; and
a second control valve mounted in the second flow passage, controlling damping fluid flow between the first fluid volume and the second fluid volume.

11. The rotary damper of claim 10 wherein an accumulator is connected to the fluid chamber.

12. The rotary damper of claim 11 wherein the accumulator comprises an accumulator wall formed in the rotor and having an end open to the fluid chamber, an accumulator cap sealing the open end of the accumulator wall, an accumulator piston slidably mounted within the accumulator wall, an accumulator gas plenum between the accumulator cap and the accumulator piston, an accumulator volume on the side of the accumulator piston opposite the accumulator gas plenum;
the rotor having a valve passage joining the first flow passage between the first check valve and the first control valve and the second flow passage between the second check valve and the second control valve; and
the rotor having an accumulator passage connecting the valve passage and the accumulator volume.

13. The rotary damper of claim 10 wherein the first check valve, the first control valve, the second check valve, and the second control valve are tuned to provide different torque when the axle is rotated in the clockwise direction from when the axle is rotated in the counterclockwise direction.

14. A rotary damper using damping fluid comprising:
a case having a fluid chamber containing the damping fluid and an axle opening;

a rotor comprising an axle and a first rotor vane, the rotor disposed within the fluid chamber so the first rotor vane divides the fluid chamber into a first fluid volume and a second fluid volume, the first rotor vane having a first flow passage and a second flow passage connecting the first fluid volume and the second fluid volume, the rotor further disposed so that the axle is rotatably supported by and passes through the axle opening, the rotor containing an accumulator hydraulically connected to the fluid chamber;

a first check valve mounted in the first flow passage, allowing damping fluid flow from the second fluid volume to the first fluid volume, and limiting flow from the first fluid volume to the second fluid volume;

a first control valve mounted in the first flow passage, controlling damping fluid flow between the first fluid volume and the second fluid volume;

a second check valve mounted in the second flow passage, allowing damping fluid flow from the first fluid volume to the second fluid volume, and limiting flow from the second fluid volume to the first fluid volume; and a second control valve mounted in the second flow passage, controlling damping fluid flow between the first fluid volume and the second fluid volume.

15. The rotary damper of claim 14 wherein the accumulator comprises an accumulator wall, an accumulator cap sealing the accumulator wall from the fluid chamber, an accumulator piston slidably mounted within the accumulator wall, an accumulator gas plenum within the accumulator wall between the accumulator cap and the accumulator piston, and an accumulator volume within the accumulator wall adjacent to the accumulator volume and hydraulically connected to the fluid chamber.

16. The rotary damper of claim 14 wherein the accumulator volume is hydraulically connected to the fluid chamber by an accumulator passage through the rotor, the accumulator passage being connected to a valve passage joining the first flow passage between the first check valve and the first control valve and the second flow passage between the second check valve and the second control valve, the valve passage being hydraulically connected to the fluid chamber.

17. A rotary damper using damping fluid comprising:

a case comprising a front side plate, a body, a rear side plate, the body having a butterfly-shaped fluid chamber containing the damping fluid, the front side plate having a first axle opening, the rear side plate having a second axle opening radially aligned with the first axle opening, the body sandwiched between the front side plate and rear side plate;

a rotor comprising an axle, a first rotor vane transversely attached to the axle, a second rotor vane transversely attached to the axle opposite to the first rotor vane, the axle passing through and supported by the first axle opening and the second axle opening, the first rotor vane disposed within the fluid chamber so as to form a first fluid volume and a second fluid volume, the second rotor vane disposed within the fluid chamber so as to form a third fluid volume and a fourth fluid volume, the first rotor vane having a first flow passage and a second flow passage connecting the first fluid volume and the second fluid volume, the rotor having a first fluid passage connecting the first fluid volume and the third fluid volume and having a second fluid passage connecting the second fluid volume and the fourth fluid volume, the rotor having a valve passage and an accumulator passage;

an accumulator connected to the fluid chamber, the accumulator comprising an accumulator wall formed in the rotor and having an end open to the fluid chamber, an accumulator cap sealing the open end of the accumulator wall, an accumulator piston slidably mounted within the accumulator wall, an accumulator gas plenum between the accumulator cap and the accumulator piston, an accumulator volume on the side of the accumulator piston opposite the accumulator gas plenum;

a first check valve mounted in the first flow passage, allowing damping fluid flow from the second fluid volume to the first fluid volume, and limiting flow from the first fluid volume to the second fluid volume;

a first control valve mounted in the first flow passage, controlling damping fluid flow between the first fluid volume and the second fluid volume;

a second check valve mounted in the second flow passage, allowing damping fluid flow from the first fluid volume to the second fluid volume, and limiting flow from the second fluid volume to the first fluid volume; and a second control valve mounted in the second flow passage, controlling damping fluid flow between the first fluid volume and the second fluid volume;

wherein the valve passage joins the first flow passage between the first check valve and the first control valve and the second flow passage between the second check valve and the second control valve; and the accumulator passage connects the valve passage and the accumulator volume.

* * * * *